(12) United States Patent
Jaranson et al.

(10) Patent No.: US 9,403,319 B2
(45) Date of Patent: Aug. 2, 2016

(54) REINFORCED THERMOPLASTIC STRUCTURAL JOINT ASSEMBLY FOR A VEHICLE

(71) Applicant: Ford Global Technologies, LLC, Dearborn, MI (US)

(72) Inventors: John W. Jaranson, Dearborn, MI (US); Kedzie Davis Fernholz, New Boston, MI (US); Richard Howard Wykoff, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 14/030,631

(22) Filed: Sep. 18, 2013

(65) Prior Publication Data

US 2014/0015272 A1    Jan. 16, 2014

Related U.S. Application Data

(62) Division of application No. 12/237,980, filed on Sep. 25, 2008, now abandoned.

(51) Int. Cl.
*B29C 65/72* (2006.01)
*B62D 27/02* (2006.01)
(Continued)

(52) U.S. Cl.
CPC ............... *B29C 65/72* (2013.01); *B62D 25/06* (2013.01); *B62D 27/02* (2013.01); *B62D 27/023* (2013.01); *B62D 29/041* (2013.01); *B62D 29/048* (2013.01); *Y10T 29/4995* (2015.01); *Y10T 29/4998* (2015.01); *Y10T 29/49826* (2015.01);
(Continued)

(58) Field of Classification Search
CPC ...... B29C 65/72; B62D 27/023; B62D 27/02; B62D 29/048; B62D 25/06; B62D 29/041; Y10T 29/49956; Y10T 29/49961; Y10T 29/4995; Y10T 29/49826; Y10T 29/4998; Y10T 403/472
See application file for complete search history.

(56) References Cited

U.S. PATENT DOCUMENTS

| 2,304,036 A | 12/1942 | Tegarty |
| 2,439,220 A | 4/1948 | Rothfuchs |
| 2,770,386 A | 11/1956 | Mitchell et al. |

(Continued)

FOREIGN PATENT DOCUMENTS

| JP | 11058518 A | 3/1999 |
| WO | 2007085560 A2 | 8/2007 |

*Primary Examiner* — John C Hong
(74) *Attorney, Agent, or Firm* — Damian Porcari; Brooks Kushman P.C.

(57) ABSTRACT

A structural joint assembly for a vehicle is provided with a first thermoplastic composite member having a protrusion containing fibrous material. A reinforcement member is provided with a receptacle for mating engagement with the protrusion. A second thermoplastic member is mounted to the first thermoplastic member over the protrusion such that the reinforcement member is provided between the first thermoplastic member and the second thermoplastic member but not adhesively bonded or overmolded therebetween. A method of manufacturing a structural joint assembly and a structural joint assembly manufactured by a method are disclosed. The methods include molding a first thermoplastic member with a protrusion with fibrous material and a second thermoplastic member. A reinforcement member has a receptacle and is mounted to the first thermoplastic member. The receptacle is retained by the protrusion without adhesive bonding or overmolding. The second thermoplastic member is joined to the first thermoplastic member.

19 Claims, 4 Drawing Sheets

(51) Int. Cl.
  *B62D 25/06* (2006.01)
  *B62D 29/04* (2006.01)

(52) U.S. Cl.
  CPC ...... *Y10T 29/49956* (2015.01); *Y10T 29/49961* (2015.01); *Y10T 403/472* (2015.01)

(56) References Cited

U.S. PATENT DOCUMENTS

| | | |
|---|---|---|
| 3,284,258 A | 11/1966 | Patti et al. |
| 3,852,151 A | 12/1974 | Knapp |
| 4,021,991 A | 5/1977 | Hotz |
| 4,115,506 A | 9/1978 | Shima |
| 4,118,051 A | 10/1978 | Shima |
| 4,226,550 A | 10/1980 | Kupcak et al. |
| 4,319,399 A | 3/1982 | Ciaffone |
| 4,492,129 A | 1/1985 | Hasegawa |
| 4,662,776 A | 5/1987 | Hedstrom et al. |
| 5,205,639 A | 4/1993 | White et al. |
| 5,365,654 A | 11/1994 | Moulton |
| 5,412,913 A | 5/1995 | Daniels et al. |
| 5,608,603 A | 3/1997 | Su |
| 5,673,711 A | 10/1997 | Andrews |
| 5,799,430 A | 9/1998 | Fremstad |
| 6,336,792 B1 | 1/2002 | Bucher et al. |
| 6,339,891 B1 | 1/2002 | Cox |
| 6,541,756 B2 | 4/2003 | Schulz et al. |
| 6,677,846 B2 | 1/2004 | Snider |
| 6,712,543 B1 | 3/2004 | Schmalzhofer |
| 6,796,474 B2 | 9/2004 | Oettinger |
| 7,467,883 B2 | 12/2008 | DeLine et al. |
| 2004/0197534 A1 | 10/2004 | Miller et al. |
| 2005/0175400 A1 | 8/2005 | Behr et al. |
| 2006/0144014 A1 | 7/2006 | Yoon et al. |

REINFORCED THERMOPLASTIC STRUCTURAL JOINT ASSEMBLY FOR A VEHICLE

CROSS-REFERENCE TO RELATED APPLICATIONS

This application is a division of U.S. application Ser. No. 12/237,980 filed Sep. 25, 2008, the disclosure of which is hereby incorporated in its entirety by reference herein.

TECHNICAL FIELD

Various embodiments relate to reinforced thermoplastic structural joint assemblies for vehicles.

BACKGROUND

Automotive vehicles typically utilize a variety of joints to assemble a vehicle from smaller components and subcomponents. Joints may be flexible to allow relative movement between two or more articles or rigid to allow little or no movement between two or more articles. In many cases, strong joints that can be manufactured reliably with good durability are desired so that the overall structure will carry the specified loads over a long period of time.

SUMMARY

In one embodiment, a structural joint assembly is provided with a first thermoplastic member having a protrusion containing fibrous material. A reinforcement member has a receptacle formed therein for mating engagement with the protrusion. A second thermoplastic member is mounted to the first thermoplastic member over the protrusion such that the reinforcement member is provided between the first thermoplastic member and the second thermoplastic member but not adhesively bonded or overmolded therebetween.

In another embodiment, a method of manufacturing a structural joint assembly is disclosed. A first thermoplastic member is molded having at least one protrusion with fibrous material provided therein. A second thermoplastic member is molded. A reinforcement member is provided and is sized to be received by the first thermoplastic member for a mating engagement with the at least one protrusion. The reinforcement member is mounted the first thermoplastic member such that the receptacle of the reinforcement member is retained by the protrusion without adhesive bonding or overmolding. The second thermoplastic member is joined to the first thermoplastic member at the at least one protrusion such that the reinforcement member is provided between the first thermoplastic member and the second thermoplastic member thereby increasing load capacity.

In yet another embodiment, a structural joint assembly manufactured by a method is provided. A first thermoplastic member is molded having at least one protrusion with fibrous material provided therein. A second thermoplastic member is molded. A reinforcement member is provided and is sized to be received by the first thermoplastic member for a mating engagement with the at least one protrusion. The reinforcement member is mounted to the first thermoplastic member such that the receptacle of the reinforcement member is retained by the protrusion without adhesive bonding or overmolding. The second thermoplastic member is joined to the first thermoplastic member at the at least one protrusion such that the reinforcement member is provided between the first thermoplastic member and the second thermoplastic member thereby increasing load capacity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
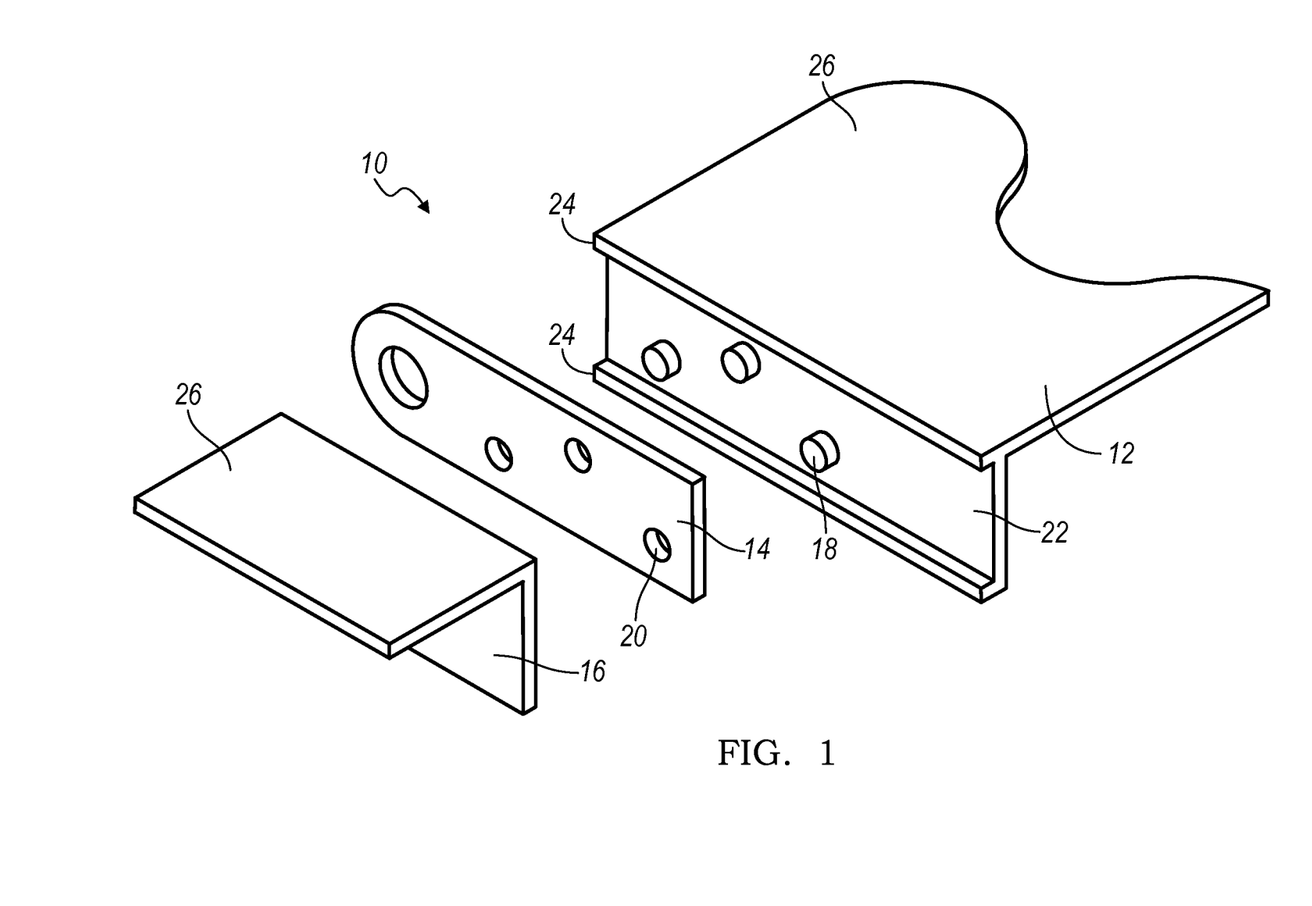
FIG. 1 is an exploded perspective view of an embodiment of a structural joint assembly.
Figure 2:
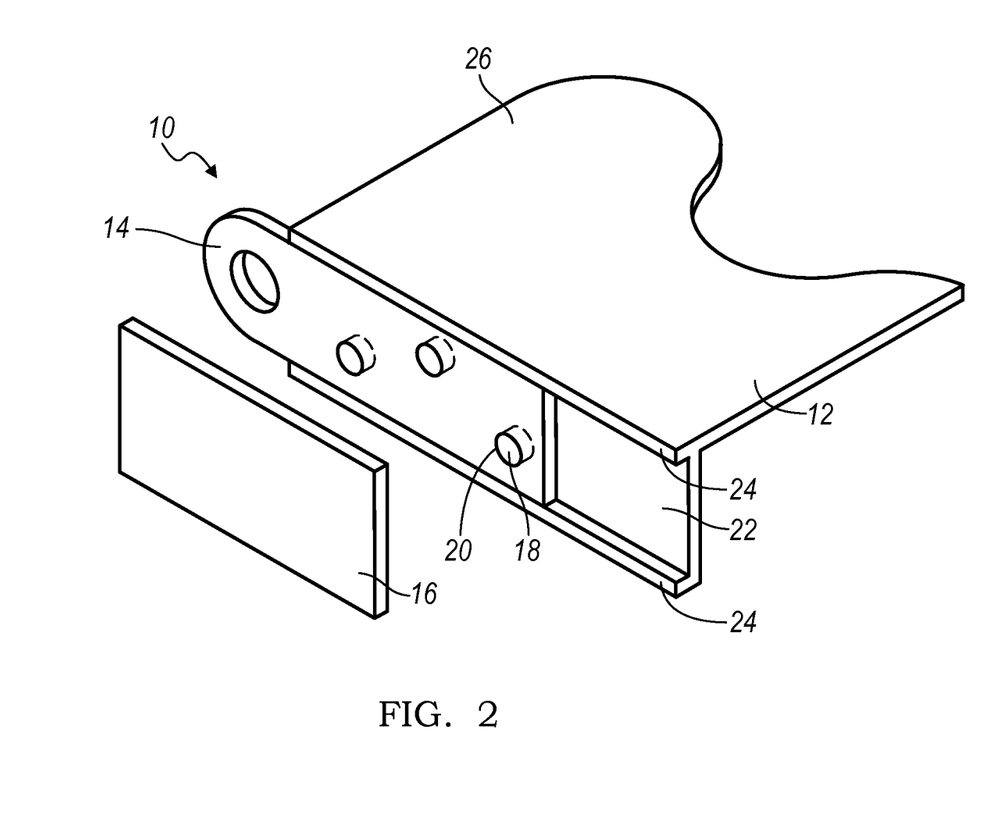
FIG. 2 is another perspective view of the structural joint assembly of FIG. 1 illustrated partially assembled.
Figure 3:
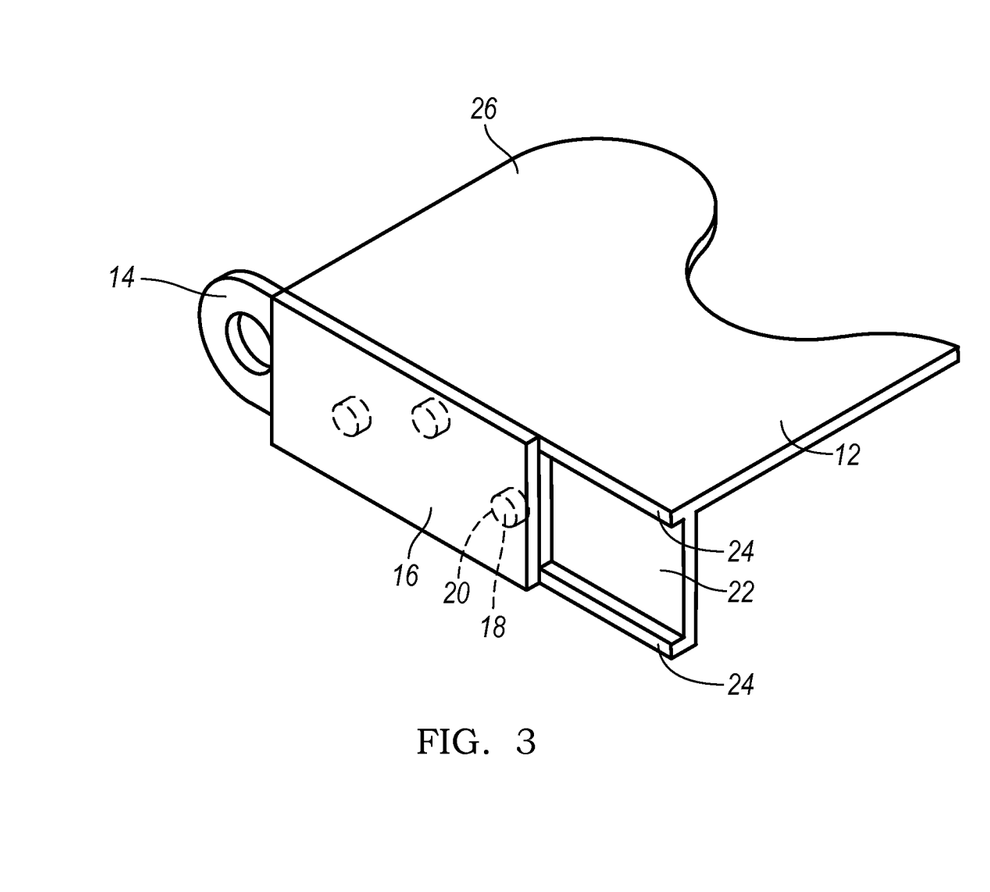
FIG. 3 is a perspective view of the structural joint assembly of FIG. 1.

With reference to FIGS. 1-3, a structural joint assembly is illustrated and generally referenced by numeral 10. The structural joint assembly 10 can be employed to join two or more components together and when assembled, can bear a load. Generally, the structural joint assembly 10 is not flexible but may allow for at least some amount of movement between the two or more components joined by the structural joint assembly 10.

In one non-limiting example, the structural joint assembly 10 is adapted to be mounted to a vehicle roof panel and a vehicle frame to join the vehicle roof panel and the vehicle frame together. The structural joint assembly 10 may be employed for any structural or semi-structural thermoplastic application, as discussed below. Of course, any shape and size for the structural joint assembly 10 is contemplated within the scope of the embodiments of the present invention.

Referring now to FIG. 1, the structural joint assembly 10 is depicted in an unassembled orientation during a manufacturing process. The structural joint assembly 10 is provided with a first thermoplastic member 12, a reinforcement member 14 and a second thermoplastic member 16.

The first thermoplastic member 12 is adapted to support a first component and the second thermoplastic member 16 is adapted to support a second component. The first thermoplastic member 12 and the second thermoplastic member 16 can be joined together as a structural joint 10 to join the first component to the second component. The first thermoplastic member 12 and the second thermoplastic member 16 can be joined together to attach components that may be mounted on or formed into the first thermoplastic member 12 and the second thermoplastic member 16.

The reinforcement member 14 is provided between the first thermoplastic member 12 and the second thermoplastic member 16 to increase load capacity of the structural joint assembly 10.

The first thermoplastic member 12 and the second thermoplastic member 16 can be made out of a thermoplastic material or a thermoplastic composite material. Non-limiting examples of the thermoplastic material include polypropylene and nylon. In at least one embodiment, the first thermoplastic member 12 and the second thermoplastic member 16 are injection molded out of the thermoplastic material or the thermoplastic composite material. Of course, the first thermoplastic member 12 and the second thermoplastic member 16 can be made out of identical or differing materials.

Creating the first thermoplastic member 12 and the second thermoplastic member 16 out of the thermoplastic material or the thermoplastic composite material can result in a relatively small weight for the structural joint assembly 10, while maintaining low production and/or assembly costs when compared to metal joint assemblies. The first thermoplastic member 12 and the second thermoplastic member 16 each have structural strengths determined by material properties of the materials used to form the first thermoplastic member 12 and the second thermoplastic member 16. Fibrous material can be added to the thermoplastic material to create a thermoplastic composite material before formation of the first thermoplastic member 12 and the second thermoplastic member 16 to increase the structural strength. In one embodiment, a glass fiber material is injection molded along with the thermoplastic material or the thermoplastic composite material. Two non-limiting examples of a thermoplastic material having fibrous material are glass reinforced nylon or glass reinforced polypropylene. The configuration of the each of the first thermoplastic member 12 and the second thermoplastic member 16 allow for generally even distribution of the fibrous material throughout each of the first thermoplastic member 12 and the second thermoplastic member 16.

To achieve increased structural strength for the structural joint assembly 10 in addition to utilization of fibrous material in the first thermoplastic member 12 and the second thermoplastic member 16, the reinforcement member 14 is oriented between the first thermoplastic member 12 and the second thermoplastic member 16.

The reinforcement member 14 may be made out of a metal material having a high load capacity relative to the thermoplastic material or thermoplastic composite material forming the first thermoplastic member 12 and the second thermoplastic member 16. In one embodiment, the metal reinforcement member 14 is fabricated out of a steel material. In another embodiment, the metal reinforcement member 14 is created out of an aluminum material. Of course, the metal reinforcement member 14 may be made out of a metal composite material. In at least one embodiment, the reinforcement member 14 is made out of a plastic or reinforced plastic (composite). Any suitable generally metal material, plastic or reinforced plastic having relatively high load capacity when compared to the thermoplastic material or thermoplastic composite material can be used to form the reinforcement member 14.

Prior art reinforcement members are overmolded or bonded in prior art joint assemblies. The overmolding process creates many concerns including design concerns, product function concerns, and cost concerns. The reinforcements must be held in place during the molding process, which is difficult, costly and time consuming. Additionally, the reinforcements need to be heated prior to molding so that the metal does not act as a heat sink and cause high stresses in the thermoplastic, adding difficulty, cost and time to the process. In addition, in reinforced thermoplastics, maintaining consistent fibrous material around the reinforcement is difficult to control and the region around the reinforcement may have a lower concentration, resulting in a weak joint. The bonding process between the metal reinforcement and the thermoplastic creates concerns about preventing surface contamination, maintaining proper bond thickness, and providing confidence in the strength of the resultant bond. Consequently, a manufacturing process that would allow for load transfer between a metal reinforcement and the thermoplastic that does not require either overmolding or bonding would be highly beneficial. Thus, the structural joint assembly 10 can be formed without overmolding or bonding while providing a high load capacity structural joint assembly 10.

As illustrated, the first thermoplastic member 12 is provided with protrusions 18. The protrusions 18 can be integrally formed within the first thermoplastic member 12. The protrusions 18, as illustrated, have a circular shape to create a large surface area for the protrusions 18.

Corresponding with the protrusions 18 formed in the first thermoplastic member 12 are receptacles 20 formed in the reinforcement member 14. The receptacles 20 can be integrally formed with the reinforcement member 14 or can be formed in a subsequent process after initial formation of the reinforcement member 14.

In FIG. 2, the joint assembly 10 is illustrated in a partially assembled orientation during manufacturing. As illustrated, the reinforcement member 14 can be mounted onto the first thermoplastic member 12 so that the protrusions 18 align with the receptacles 20. The contact between the protrusions 18 and the receptacles 20 retain the reinforcement member 14 on the first thermoplastic member 12 so that the reinforcement member 14 does not need to be held onto the first thermoplastic member 12.

The protrusions 18 may be generally flush with the surface of the reinforcement member 14, as illustrated. In another embodiment, the protrusions 18 extend beyond the surface of the reinforcement member 14 to facilitate joining the second thermoplastic member 16 to the first thermoplastic member 12, which is discussed further below.

In FIG. 3, the structural joint assembly 10 is illustrated upon completion of the manufacturing process. After mounting the reinforcement member 14 to the first thermoplastic member 12 (shown in FIG. 2), the second thermoplastic member 16 is mounted to the first thermoplastic member 12. The reinforcement member 14 is generally provided between the first thermoplastic member 12 and the second thermoplastic member 16.

In one embodiment, the second thermoplastic member 16 is joined to the first thermoplastic member 12 at the plurality of protrusions 18 that are exposed through the receptacles 20 in the reinforcement member 14. The second thermoplastic member 16 can be joined to the first thermoplastic member 12 through thermoplastic welding along contact regions between the first thermoplastic member 12 and the second thermoplastic member 16. The contact regions correspond to the locations of the protrusions 18. Thermoplastic welding includes, but of course is not limited to, vibration welding, ultrasonic welding, and laser welding.

The structural joint assembly 10 illustrated in an assembled orientation in FIG. 3 is less expensive to manufacture than prior art assemblies of equivalent structural load capacity since the metal is not bonded to the thermoplastic and an overmolding process is not required. Additionally, molding the first thermoplastic member 12 and the second thermoplastic member 16 would be less complicated and less expensive since shut-offs would not be required to prevent resin from flowing onto portions of the metal that need to be free from polymer. Furthermore, creating the joint assembly 10 in the manner described herein is more likely to result in adequate fiber distribution of the fibrous material in the protrusions 18, which can create a stronger joint assembly 10 than what is possible in an overmolded configuration. Finally, this method of manufacturing allows the assembly to be designed and manufactured with a slip plane that allows the components of the assembly to grow and shrink independently without inducing warpage in the assembly.

In at least one embodiment, illustrated in FIGS. 1-3, the first thermoplastic member 12 has a channel 22 defined by a pair of protruding surfaces 24. The channel 22 is recessed within the first thermoplastic member 12 so that the reinforcement member 14 can be nested within the channel 22.

The second thermoplastic member 16 may be joined to the first thermoplastic member 12 along the pair of protruding surfaces 24. In another embodiment, the protruding surfaces 24 are additional protrusions and/or flanges to provide additional surface area to join the first thermoplastic member 12 to the second thermoplastic member 16.

As depicted in FIG. 1, flanges 26 may be integrally formed with each of the first thermoplastic member 12 and the second thermoplastic member 16. The flanges 26 may be employed to join the structural joint assembly 10 to components. The flanges 26 may allow the joint assembly 10 to be utilized to join two or more materials so that the joint assembly 10 is surrounded by the two or more materials so that the joint assembly 10 is not viewable. Of course, any shape, size and amount for the flanges 26 are contemplated within the scope of the embodiments of the present invention.

The joint assembly 10 may be utilized in any structural or semi-structural thermoplastic application in the automotive field, including but not limited to polycarbonate glazings, composite seats, thermoplastic liftgate/tailgate constructions, front-end modules. In at least one embodiment, the joint assembly 10 is utilized in an automotive vehicle application such that the joint assembly 10 is not externally viewable by an occupant so that the joint assembly 10 can have surface defects that are not visible to the occupant. Of course, the joint assembly 10 may be utilized in any structural or semi-structural thermoplastic application given the ever increasing use of thermoplastics in semi-structural applications.

With reference now to FIGS. 4a-4g, a plurality of embodiments depicting the reinforcement member 14 mounted to the first thermoplastic member 12 are illustrated.

Figure 4A:
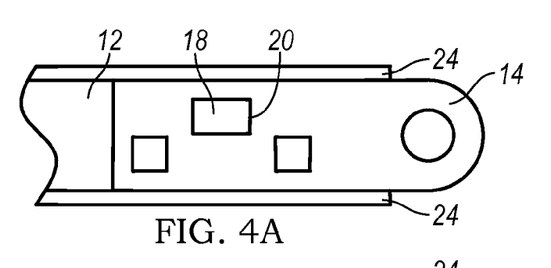
FIG. 4a is an elevation view of an embodiment of a portion of a structural joint assembly.

In FIG. 4a, multiple polygonal shaped protrusions 18 are depicted along with corresponding polygonal shaped receptacles 20. In one embodiment, the protrusions 18 and the receptacles 20 are further defined as rectangles. The protrusions 18 and the receptacles 20 may have rounded corners for ease of production.

Figure 4B:
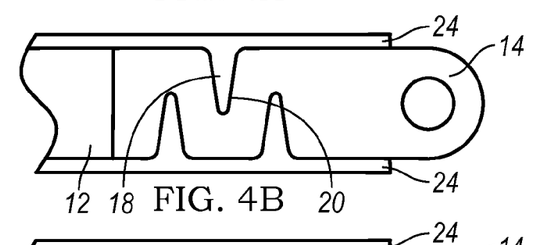
FIG. 4b is an elevation view of another embodiment of a portion of a structural joint assembly.

In FIG. 4b, multiple triangular shaped protrusions 18 are illustrated along with corresponding triangular shaped receptacles 20. As illustrated, the protrusions 18 and the receptacles 20 may abut the pair of protruding surfaces 24. In at least one embodiment, the protrusions 18 form a continuous surface with the pair of protruding surfaces 24.

Figure 4C:
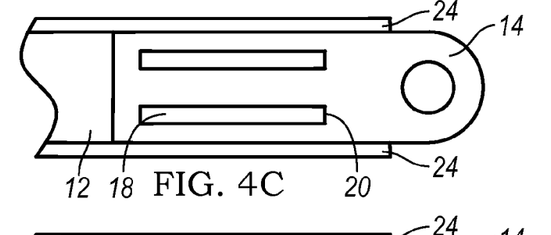
FIG. 4c is an elevation view of another embodiment of a portion of a structural joint assembly.

In FIG. 4c, multiple polygonal shaped protrusions 18 are shown along with corresponding polygonal shaped receptacles 20. In the illustrated embodiment, the protrusions 18 and the receptacles 20 are further defined as rectangles. The protrusions 18 and the receptacles 20 may have rounded corners for ease of production.

Figure 4D:
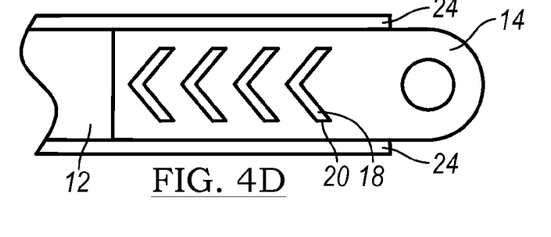
FIG. 4d is an elevation view of yet another embodiment of a portion of a structural joint assembly.

In FIG. 4d, multiple irregular shaped protrusions 18 are depicted along with corresponding irregular shaped receptacles 20. The protrusions 18 and the receptacles 20 may have rounded corners for ease of production.

Figure 4E:
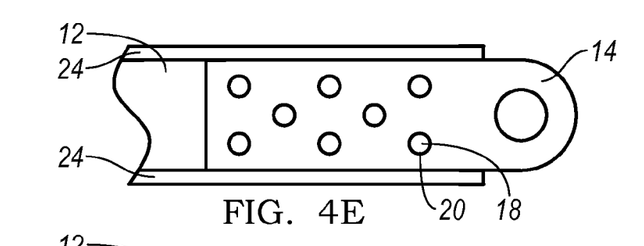
FIG. 4e is an elevation view of still another embodiment of a portion of a structural joint assembly.
Figure 4F:
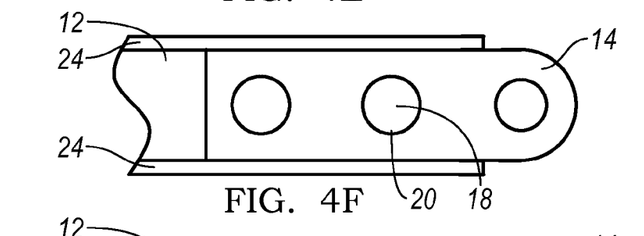
FIG. 4f is an elevation view of still another embodiment of a portion of a structural joint assembly.
Figure 4G:
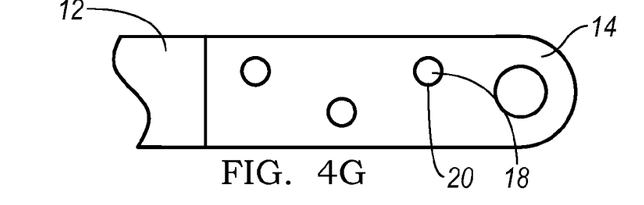
FIG. 4g is an elevation view of yet another embodiment of a portion of a structural joint assembly.

Referring to FIGS. 4e-g, multiple circular shaped protrusions 18 are illustrated along with corresponding circular shaped receptacles 20. Of course, any amount and location for the protrusions 18 and corresponding receptacles 20 are contemplated within the scope of the embodiments of the present invention.

Figure 4H:
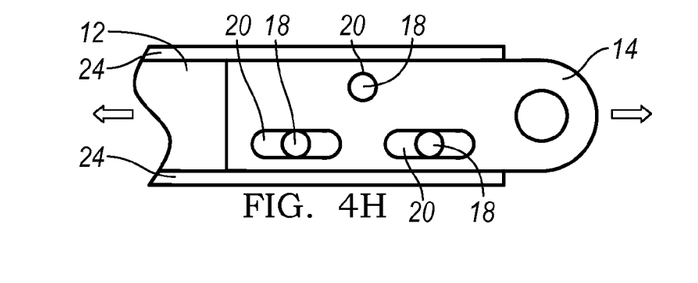
FIG. 4h is an elevation view of yet another embodiment of a portion of a structural joint assembly.

With reference now to FIG. 4h, protrusions 18 are formed in the first thermoplastic member 12 and different sized receptacles 20 are formed in the reinforcement member 14. At least one receptacle 20 may be sized to receive at least one of the protrusions 18 so that the reinforcement member 14 is secured to the first thermoplastic member 12. One or more receptacles 20 may be oversized relative to the protrusions 18 to allow for thermal growth of the first thermoplastic member 12 since the first thermoplastic member 12 may have a different expansion rate than the reinforcement member 14. The oversized receptacles 20 may each have a length that is greater than a length of the protrusions 18 while having a width that allows for contact between the protrusions 18 and receptacles 20.

As illustrated, one receptacle 20 is sized to receive one protrusion 18 and two receptacles 20 are oversized compared to the protrusions 18. The oversized protrusions 20 allow for thermal growth of the first thermoplastic member 12 in directions indicated by arrows provided proximate the first thermoplastic member 12. In another embodiment, one receptacle 20 is sized to receive one protrusion 18 at one end of the first thermoplastic member 12 with two oversized protrusions 20 to allow for thermal growth in only one direction, opposite the end with the fitted protrusion 18 and receptacle 20. Of course, any combination of receptacles 18, fitted protrusions 20 and oversized protrusions 20 are contemplated within the scope of the embodiments of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a structural joint assembly comprising:
    molding a first thermoplastic member with fibrous material and having peripheral ribs defining a recessed channel with at least one protrusion extend from the channel;
    molding a second thermoplastic member;
    providing a reinforcement member sized to be received within the channel of the first thermoplastic member and having a receptacle for a mating engagement with the at least one protrusion;
    mounting the reinforcement member to the first thermoplastic member such that the receptacle of the reinforcement member is retained by the protrusion without adhesive bonding or overmolding and the reinforcement member; and
    abutting an inner surface of the second thermoplastic member to the first thermoplastic member along the peripheral ribs and the at least one protrusion such that the reinforcement member is provided between the first thermoplastic member and the second thermoplastic member;

welding the second thermoplastic member to the first thermoplastic member by applying thermoplastic welding to an outer surface of the second thermoplastic member to entirely enclose the reinforcement within the first and second thermoplastic members with a thermoplastic weld along the peripheral ribs thereby increasing load capacity.

2. The method of manufacturing of claim 1 further comprising:
providing the first thermoplastic member with a plurality of protrusions; and
providing the reinforcement member with a plurality of receptacles corresponding with the plurality of protrusions of the first thermoplastic member.

3. The method of manufacturing of claim 1 further comprising:
providing the first thermoplastic member with a plurality of protrusions and having a circular shape; and
providing the reinforcement member with a plurality of receptacles corresponding with the plurality of protrusions of the first thermoplastic member and having a circular shape.

4. The method of manufacturing of claim 1 further comprising:
providing the first thermoplastic member with a plurality of protrusions and having a rectangular shape; and
providing the reinforcement member with a plurality of receptacles corresponding with the plurality of protrusions of the first thermoplastic member and having a rectangular shape.

5. The method of manufacturing of claim 1 further comprising:
providing the first thermoplastic member with a plurality of protrusions and having a triangular shape; and
providing the reinforcement member with a plurality of receptacles corresponding with the plurality of protrusions of the first thermoplastic member and having a triangular shape.

6. The method of manufacturing of claim 1 wherein the reinforcement member is further defined as a metal reinforcement member thereby further increasing load capacity.

7. The method of manufacturing of claim 1 further comprising:
molding first thermoplastic member and the second thermoplastic member with flanges; and
mounting the first thermoplastic member and the second thermoplastic member to structural components in an automotive vehicle with the flanges.

8. The method of manufacturing of claim 1 further comprising:
mounting at least one of the first thermoplastic member and the second thermoplastic member to a vehicle roof panel; and
mounting the other of the first thermoplastic member and the second thermoplastic member to a vehicle frame.

9. The method of manufacturing of claim 1 further comprising molding the second thermoplastic without any openings.

10. A structural joint assembly manufactured by a method comprising:
molding a first thermoplastic member with fibrous material having peripheral ribs defining a channel with at least one protrusion provided therein;
molding a second thermoplastic member;
providing a reinforcement member sized to be received by channel in the first thermoplastic member and having a receptacle for a mating engagement with the at least one protrusion;
mounting the reinforcement member to the first thermoplastic member such that the receptacle of the reinforcement member is retained in the channel by the protrusion without adhesive bonding or overmolding; and
joining the second thermoplastic member to the first thermoplastic member along the ribs and the at least one protrusion such that the reinforcement member is entirely enclosed within the first thermoplastic member and the second thermoplastic member thereby increasing load capacity.

11. The structural joint assembly of claim 10 wherein the first thermoplastic member is molded with a pair protrusions and the reinforcement member has a pair of corresponding pre-formed receptacles formed therein, the pair of protrusions mating with the pair of receptacles to align the reinforcement member with the first thermoplastic member.

12. The structural joint assembly of claim 10 wherein at least one of the first thermoplastic member and the second thermoplastic member is molded with a flange which is mounted to a structural component in an automotive vehicle.

13. The structural joint assembly of claim 12 wherein at least one of the first thermoplastic member and the second thermoplastic member is mounted to a vehicle roof panel and the other of the first thermoplastic member and the second thermoplastic member is mounted to a vehicle frame.

14. The structural joint assembly of claim 10 wherein the reinforcement member is formed from a metallic material.

15. A manufacturing method comprising:
molding a first thermoplastic member with fibrous material having a peripheral ribs defining a recessed channel with a protrusion disposed therein;
mounting a metal reinforcement having a preformed receptacle such that the receptacle is retained on the protrusion and within the channel;
welding a second thermoplastic member to the first thermoplastic member along the protrusion and ribs such that the reinforcement is entirely enclosed within the first and second thermoplastic members.

16. The manufacturing method of claim 15 further comprising molding the first thermoplastic member with a pair of protrusions and the reinforcement has a pair of corresponding preformed receptacles formed therein, the pair of protrusions mating with the pair of receptacles to align the reinforcement with the first thermoplastic member.

17. The manufacturing method of claim 15 further comprising:
abutting an inner surface of the second thermoplastic member to the first thermoplastic member along the peripheral ribs and the at least one protrusion;
welding the second thermoplastic member to the first thermoplastic member by applying thermoplastic welding to an outer surface of the second thermoplastic member to entirely enclose the reinforcement within the first and second thermoplastic members with a thermoplastic weld along the peripheral ribs.

18. The manufacturing method of claim 15 further comprising:
molding first thermoplastic member and the second thermoplastic member with flange; and
mounting the first thermoplastic member and the second thermoplastic member to structural components in an automotive vehicle with the flanges.

19. The manufacturing method of claim 15 further comprising:
 mounting the first thermoplastic member to a first automotive structural component; and
 mounting the second thermoplastic member to a second automotive structural component.

\* \* \* \* \*